May 31, 1966     W. A. YONKERS     3,254,273
STANDARD MAGNET
Filed Oct. 31, 1963
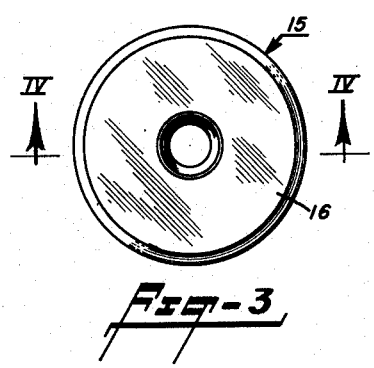
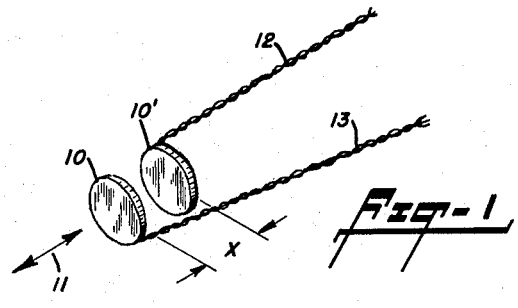
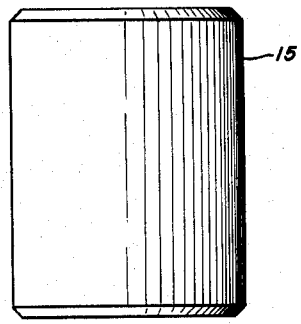
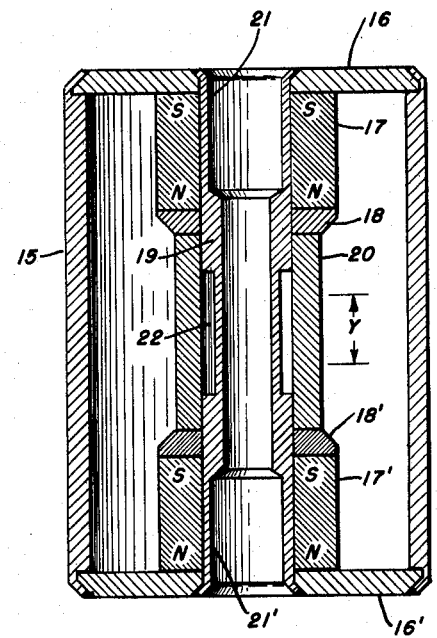
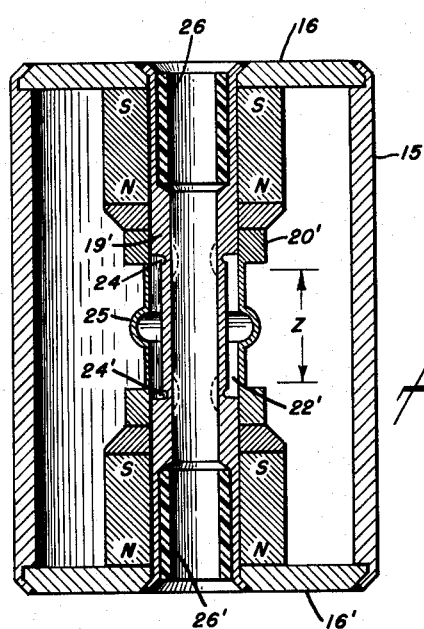
WILLIAM A. YONKERS
INVENTOR.
BY *Rudolph J. Junick*
ATTORNEY

United States Patent Office 3,254,273
Patented May 31, 1966

3,254,273
STANDARD MAGNET
William A. Yonkers, Mountain Lakes, N.J., assignor to Radio Frequency Laboratories, Inc., Boonton, N.J., a corporation of New Jersey
Filed Oct. 31, 1963, Ser. No. 320,442
7 Claims. (Cl. 317—158)

This invention relates to a standard magnet and more particularly to a magnetic structure providing a uniform, constant magnetic flux field across a gap of predetermined configuration.

Gaussmeters are instruments for measuring the strength and/or gradient of magnetic flux fields. Such instruments include an appropriate sensing probe made of a material which exhibits the Hall effect. In order to assure accurate readings, the calibration of a gaussmeter is checked, periodically, by placing the sensing probe in a magnetic field of known strength. Standard, or reference, magnets are provided for this purpose.

A standard magnet comprises a structure including one or more permanent magnets developing a fixed field across an effective air gap of predetermined configuration. The magnetic flux density must be uniform throughout the effective gap to preclude errors due to the positioning of the sensing probe within the gap. Also, the device must be shielded from the influence of external magnetic fields which would change the strength of the magnetic field from the initial, calibrated level. These requirements are essential to provide a standard magnet which can be relied upon as a primary reference.

In the case of a gaussmeter designed for the direct measurement of magnetic field gradients within an opening, the probe consists of two, axially-spaced sensing elements. With the two sensing elements connected in opposition, the reading of the gaussmeter will correspond to the difference in the magnetic intensity of the field effective on the two sensing elements. A standard magnet intended for use in checking such differential gaussmeter must have an effective gap within which the magnetic flux is uniform and constant over a gap length equal to some predetermined separation of the sensing elements. Thus, when the probe is positioned in the gap of the standard magnet, each sensing element is subjected to the same level of magnetic intensity. By connecting the elements in opposition, the pointer of the gaussmeter should indicate zero with reference to the associated scale, whereas separate connection of the probes to the instrument should provide identical deflections of the pointer. A standard magnet made as hereindescribed can be used for standardizing a gaussmeter combination with two, axially-spaced sensing elements as well as a single sensing element.

An object of this invention is the provision of a standard magnet of rugged construction and adapted for use in standardizing a gaussmeter having two, axially-spaced sensing elements.

An object of this invention is the provision of a standard magnet having a magnetic flux gap of circular cross-section and predetermined axial length and wherein the flux density is constant throughout a predetermined length of the gap.

An object of this invention is the provision of a standard magnet having a pair of spaced cylindrical magnets disposed within a housing, means forming a gap of given cross-sectional configuration between the magnets, and means establishing a uniform distribution of the magnetic field along a preedtermined length of the gap.

An object of this invention is the provision of a standard magnet having a cylindrical housing of magnetic material, a pair of permanent magnets disposed in the housing, means forming a circular passageway through the housing and the magnets, which passageway is concentric with the axis of the housing, and means modifying the path of the magnetic flux lines between the magnets in a manner to produce a constant magnetic flux density along a predetermined axial length of the said passageway.

These and other objects and advantages of the invention will become apparent from the following description when taken in connection with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a diagrammatic illustration showing two, circular, axially-spaced sensing elements;

FIGURE 2 is a side elevational view of a standard magnet made in accordance with this invention;

FIGURE 3 is an end view thereof;

FIGURE 4 is an enlarged, axial cross-sectional view taken along the line IV—IV of FIGURE 3; and FIGURE 5 is a similar cross-sectional view showing another embodiment of the invention.

Reference, first, is made to FIGURE 1, which shows two, circular sensing elements 10, 10' axially spaced apart by the distance X. As is well known, the sensing elements are made of a material which exhibits the Hall effect, such as, for example, indium arsenide. These materials have a property such that an electrical potential is produced at laterally-spaced points along one axis of the material when a current is passed through an orthogonal axis thereof under the influence of a mutually perpendicular magnetic field. In FIGURE 1, the direction of such magnetic field is indicated by the arrow identified by the numeral 11 and the four lead wires connected to each element are indicated by the numerals 12 and 13. In actual practice, the elements and lead wires are mounted in an appropriate probe head, preferably arranged so that both elements may be used simultaneously for the direct measurement of magnetic field gradients, or each element may be used separately to measure field intensity. In any event, the standard magnet must be arranged to receive the sensing elements and, in the case of two, axially spaced elements, the magnetic flux density in the gap must be uniform over an axial length at least equal to the same fixed, predetermined distance X.

Referring, now, to FIGURES 2, 3 and 4, a standard magnet made in accordance with one embodiment of this invention comprises a tubular body member 15, of soft iron, or other suitable material, closed at opposite ends by circular end plates 16, 16', made of the same material. Each plate has a central hole formed therethrough and has a beveled outer edge. The ends of the housing are bored to a reduced wall thickness, thereby forming shoulders to receive the end plates after which the housing ends are peened over, as shown in FIGURE 4, thereby forming a rugged structure.

The magnetic field is developed by two, cylindrical magnets 17, 17' having soft-iron pole pieces 18, 18' associated therewith. A tubular member 19, made of soft iron, extends through aligned, central holes formed in the magnets and the pole pieces, such member having its outer ends flared outwardly against beveled inner surfaces formed in the associated end plates. A tube 20, made of a non-magnetic metal, such as brass, encloses the inner portion of the tubular member 19 and has its end abutting the surfaces of the pole pieces 18, 18'. Such tube 20 acts as a separator to retain the magnets and the pole pieces in the illustrated positions.

The tubular member 19 is a single tube having relatively thin-walled end sections, identified by the numerals 21, 21'. These end sections are made as thin as possible to produce a minimum shunting effect upon the magnets. On the other hand, the cross-sectional area of the relatively thick intermediate portions of the member 19 is such that these portions will be substantially saturated by the magnetic flux produced by the magnets, the magnetic polarities being as indicated by the letters S and N.

The outer surface of the tubular member 19, at the central portion thereof, is milled to form the circumferential groove 22 having an axial length somewhat greater than the predetermined length of the working portion of the flux gap. Specifically, if the axial spacing X (FIGURE 1) of the sensing elements is 3/8" for checking purposes, the axial length of the groove 22 will be, say, 1/2 inch long. The primary path for the flow of magnetic flux between the two permanent magnets is the tubular member 19 (the relatively thick central portion of the tube extending into the magnets for this purpose), and the return path comprises the end plates 16, 16' and the housing 15. Although a certain amount of flux leakage occurs along the thickest portion of the member 19, the flux leakage deliberately is increased significantly along the reduced-thickness, central portion of the member, that is, in the region of the groove 22. By properly proportioning the several different cross-sectional areas of the member 19, with regard to the maximum magnetic intensity developed by the particular magnets, the magnetic flux within the tube can be made uniform and parallel over an axial distance Y, which distance is somewhat greater than the preselected axial spacing X of the sensing elements, for test purposes.

In order to standardize a gaussmeter having two sensing elements (such as the elements 10, 10' shown in FIGURE 1), the elements are slidably inserted into the axial passageway of the standard magnet. By means of a suitable switching arrangement, forming part of the gaussmeter, one probe is connected into the gaussmeter circuit and the reading of the indicating instrument is noted. The operator now moves the sensing element back and forth, slightly, within the passageway until such movement produces no change in the instrument indication. The operator now knows that such probe is disposed within the uniform magnetic flux field. In the case of a standard magnet having a rating of 500 gauss, the pointer of the indicating instrument should be aligned with the 500 mark on the associated scale, which scale is, of course, calibrated in gauss. Any deviation from such instrument indication is corrected by means of conventional adjustments provided on the gaussmeter. The second sensing element is then connected into the gaussmeter circuit and the stated procedure is repeated. At this point, the gaussmeter circuits for the individual sensing probes have been standardized so that the calibrations of the instrument scale can be relied upon. The two sensing elements now are connected in opposition whereby the gaussmeter reading should be zero. If such is not the case, the differential circuit of the gaussmeter is adjusted accordingly, whereby the apparatus is conditioned for the measurement of the gradient of an unknown magnetic field.

The construction described hereinabove results in a completely shielded standard magnet of rugged construction. Such standard magnet may be used to calibrate gaussmeters having a single sensing element as well as gaussmeters utilizing two, axially-spaced sensing elements wherein the element spacing can be reduced to a value somewhat less than the axial length of the uniform magnetic flux field provided in the standard magnet.

An arrangement for extending the axial length of the uniform flux gap is illustrated in FIGURE 5. Here, the soft-iron tubular member 19' has a reduced thickness central portion defined by the circumferential groove 22' which groove, however, terminates in circular channels 24, 24', of greater depth. Such construction results in a peaking of the individual flux lines in the region of the two channels (as shown by the dotted lines), which has the effect of producing parallel flux lines, within the tubular member 19', over an axial distance (Z), which distance (Z) is somewhat greater than the distance (Y) shown in the FIGURE 4 arrangement.

In the FIGURE 5 construction, the non-magnetic tube 20', serving as a spacer between the pole pieces of the magnets, is formed to have a reduced-thickness central portion which is bowed outwardly to form the reverse bend 25. In the assembly of the device, the permanent magnets, pole pieces and spacer tube 20' are slidably positioned on the tubular member 19'. Such sub-assembly is then positioned within the housing with an end of the tubular member 19' positioned within the central hole of an end plate, which end plate has previously been secured to the housing 15 by a peening operation. The other end plate is now placed on the free end of the tubular member 19' and secured in place by peening over the housing end. Variations in the thickness of the magnets, pole pieces and end plates are compensated for by compressive flexing of the bend 25, in the spacer tube 20', as the second end plate is secured to the housing.

As has been explained, the end sections of the tubular member 19' are made as thin as possible to minimize the shunting effect of these sections on each magnet. At the same time, the sections of maximum thickness must have a cross-sectional area sufficient to provide a desired level of magnetic intensity within the central portion of the member 20', which portion constitutes the effective flux gap of the completed standard magnet. Nylon bushings 26, 26' may be cemented into the ends of the member 19', as shown, to thereby provide a smooth, continuous inner wall from one end of the device to the other. This eliminates the possibility of damaging the delicate probe during insertion thereof into proper position in the flux gap since, desirably, the cross-section of the flux gap should not be materially greater than that of the probe.

Having now described and illustrated two embodiments of the invention, those skilled in this art will be able to make various changes and modifications without thereby departing from the scope and spirit of the invention as recited in the following claims.

I claim:

1. A standard magnet comprising,
    (a) a cylindrical housing of magnetic material,
    (b) end plates of magnetic material closing the ends of the housing, said plates having axially aligned holes formed therein,
    (c) a pair of axially spaced permanent cylindrical magnets within the housing and with a central hole extending therethrough, wherein a polar surface of each magnet abuts against one of said end plates,
    (d) means forming a passageway which communicates with the holes formed in the end plates and extends through the holes in the magnets and
    (e) means modifying the shape of the magnetic flux between said magnets in a manner to produce a constant magnetic flux density over a predetermined length of said passageway.

2. A standard magnet comprising
    (a) a cylindrical housing of magnetic material,
    (b) end plates of magnetic material closing the ends of the housing, said plates having axially aligned holes formed therein,
    (c) a pair of axially spaced permanent magnets within the housing,
    (d) a tube made of magnetic material forming a passageway which communicates with the holes formed in the end plates
    (e) said tube modifying the shape of the magnetic flux between said magnets in a manner to produce a constant magnetic flux density over a predetermined length of said passageway, and
(f) a spacer tube of non-magnetic material disposed over the said tube of magnetic material and between the said magnets, said spacer tube including a central section subject to transverse flexing in response to pressure applied axially thereto.

3. A standard magnet comprising,
(a) a tubular housing of magnetic material,
(b) end plates of magnetic material closing the ends of the housing, said plates being provided with axially-aligned holes,
(c) a pair of permanent magnets disposed within the housing, each magnet having a central hole extending therethrough and having a polar surface abutting an end plate,
(d) a tube of magnetic material extending through the holes in the magnets and communicating with the holes in the end plates, said tube having a central portion of reduced wall thickness, and
(e) a spacer tube of non-magnetic material positioned over the said tube of magnetic material and between the magnets.

4. The invention as recited in claim 3, including a pair of soft-iron pole pieces, each pole piece abutting the other polar surface of a magnet, and wherein the ends of the said spacer tube abut the pole pieces.

5. The invention as recited in claim 4, wherein the said spacer tube includes a central section subject to transverse flexing in response to pressure applied axially thereto.

6. The invention as recited in claim 3, wherein the internal diameter of the said tube of magnetic material is constant over an axial distance equal to the spacing between the magnets, and wherein the reduced wall thickness portion terminates in circular grooves formed in the tube outer surface.

7. The invention as recited in claim 6, wherein the said spacer tube includes a central portion of reduced wall thickness and flared outwardly in a plane substantially normal to the tube axis.

References Cited by the Examiner

UNITED STATES PATENTS 2,579,273  12/1951  Reisner _____ 317—201 X
2,876,373  3/1959  Veith et al.

BERNARD A. GILHEANY, *Primary Examiner.*

JOHN F. BURNS, ROBERT K. SCHAEFER,
*Examiners.*

G. HARRIS, JR., *Assistant Examiner.*